United States Patent [19]

Kamiguchi et al.

[11] Patent Number: 4,970,447
[45] Date of Patent: Nov. 13, 1990

[54] SOFTWARE SERVO CONTROL APPARATUS FOR USE IN AN INJECTION MOLDING MACHINE

[75] Inventors: Masao Kamiguchi; Noriaki Neko, both of Yamanashi, Japan

[73] Assignee: Fanuc Ltd., Minamitsuru, Japan

[21] Appl. No.: 314,060

[22] PCT Filed: Jul. 15, 1988

[86] PCT No.: PCT/JP88/00708
 § 371 Date: Feb. 9, 1989
 § 102(e) Date: Feb. 9, 1989

[87] PCT Pub. No.: WO89/00490
 PCT Pub. Date: Jan. 26, 1989

[30] Foreign Application Priority Data

Jul. 15, 1987 [JP] Japan ............................. 62-174822

[51] Int. Cl.⁵ ............................................. B29C 45/76
[52] U.S. Cl. ........................................ 318/567; 318/571; 425/145; 425/149; 367/473
[58] Field of Search ............................. 318/560-573, 318/632; 364/476, 473; 425/149-159

[56] References Cited

U.S. PATENT DOCUMENTS

| | | | |
|---|---|---|---|
| 4,411,609 | 10/1983 | Yoshii et al. | 425/149 |
| 4,695,237 | 9/1987 | Inaba | 364/473 X |
| 4,718,841 | 1/1988 | Kiya | 425/149 |
| 4,721,589 | 1/1988 | Harris | 425/145 X |
| 4,734,025 | 3/1988 | Kawamura et al. | 425/145 |
| 4,755,123 | 7/1988 | Otake | 425/145 |
| 4,759,705 | 7/1988 | Otake et al. | 425/145 |
| 4,774,675 | 9/1988 | Kagawa | 425/149 X |
| 4,826,640 | 5/1989 | Neko | 425/145 X |
| 4,828,473 | 5/1989 | Otake et al. | 425/149 X |

Primary Examiner—William M. Shoop, Jr.
Assistant Examiner—Paul Ip
Attorney, Agent, or Firm—Staas & Halsey

[57] ABSTRACT

A software servo control apparatus for use in an electrically-operated injection molding machine, which is capable of changing servo control variable constants, without the need of changing hardware arrangement, for greatly enhancing versatility for the machine, and of effecting appropriate pressure control. A servo control microprocessor (13) operates, in accordance with a servo control program, to determine a commanded current on the basis of a positional deviation amount, obtained from an output of a pulse encoder (5), and a moving command. The servo control microprocessor also determines an amount of a change in the output of the pulse encoder, and supplies a power amplifier (6) with the difference between the commanded current and an output of the same amplifier, for control of the drive of a servomotor (2). Further, the output of the amplifier is restricted to a value less than a commanded torque on the basis of an output of a pressure sensor (4) and the commanded torque.

5 Claims, 2 Drawing Sheets

4,970,447

SOFTWARE SERVO CONTROL APPARATUS FOR USE IN AN INJECTION MOLDING MACHINE

BACKGROUND OF THE INVENTION

1. Field of the Invention

The present invention relates to an electrically-operated injection molding machine having servomotors as drive sources for various operating sections, and more particularly to a software servo control apparatus for use in an electrically-operated injection molding machine, which is capable of changing servo control variable constants and has a great versatility, and is further capable of performing appropriate torque control.

2. Description of the Related Art

Typically, a conventional electrically-operated injection molding machine is provided with hardware servo circuits each including a position control unit, a speed control unit, and an electric current control unit, for controlling position, speed, and torque of each of plural servomotors associated with various operating sections of the injection molding machine. Also, it has been known to employ a servo circuit of a type having a torque limit means arranged between the speed control unit and the electric current control units for restricting the output torque of an associated servomotor to a commanded torque limit value.

The injection molding machine includes various operating sections such as an injection mechanism, a mold clamping mechansim, etc.; that is, it includes various control axes such as an injection axis, a screw rotation axis, a clamp axis, etc. Therefore, conventionally, it has been necessary to provide the above-mentioned hardware servo circuits for respective axes. Moreover, to change various servo control variable constants which determine reponse characteristics of various sections of a servo system, and the like, replacement of part or all of servo circuit components is required. In addition, since the unit of the torque limit value for presure control is determined in dependence on the hardware arrangement which forms the pressure control system, there is a restriction in improving accuracy in pressure control.

SUMMARY OF THE INVENTION

The object of the present invention is to provide a software servo control apparatus for use in an electrically-operated injection molding machine having a servomotor as drive source, which is capable of controlling the drive of the servomotor without the need of employing a hardware servo circuit.

In order to achieve the above-mentioned object, according to the present invention, a software servo control apparatus for the use in an electrically-operated injection molding machine comprises means for executing a predetermined control program for servo control, and means for driving a servomotor in accordance with a control output from the program executing means.

As mentioned above, according to the present invention, since the drive of a servomotor is controlled in accordance with a control output from means for executing a predetermined servo control program, the drive of the servomotor can be controlled, without the need of using hardware servo circuits, so as to achieve desired control operations in an injection molding machine, and various servo control variable constants can be changed solely by changing the servo control program so as to easily achieve alteration and adjustment of control operation conditions. Further, appropriate pressure control can be achieved since the output torque of the servomotor can be controlled through the medium of the software process.

DESCRIPTION OF THE PREFERRED EMBODIMENT

Figure 2:
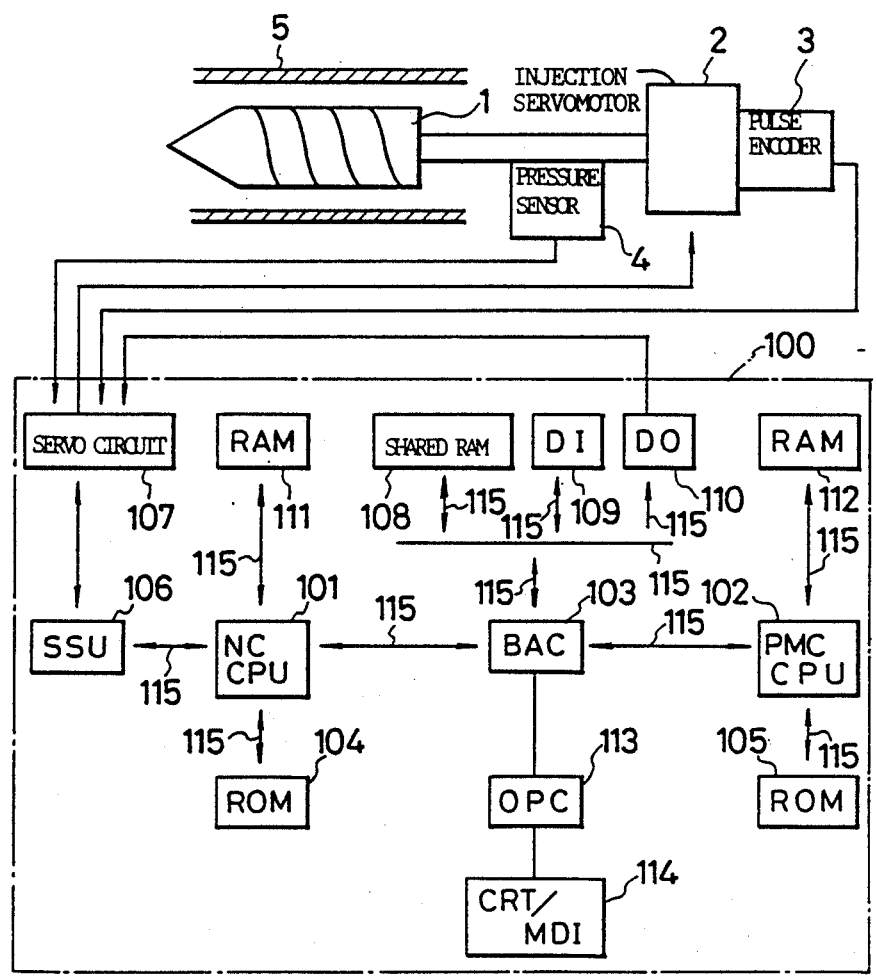
FIG. 2 is a block diagram of an injection molding machine equipped with a conventional hardware servo apparatus.

Prior to explaining the arrangement of the present invention, an explanation as to a typical conventional arrangement will be given with reference to FIG. 2. In FIG. 2, an arrangement associated with an injection axis alone of an injection molding machine is shown, and illustrations and explanations for mold clamping axis, screw rotation axis, ejector axis, etc., are omitted.

Reference numeral 2 shows an injection servomotor for axially driving a screw 1 disposed in a cylinder 5, which is provided with a pulse encoder 3 for detecting the rotational position of the motor, i.e., the screw position. A pressure sensor 4 for detecting the pressure applied from a resin material to the screw 1 is disposed on a thrust bearing (not shown) which axially supports the screw 1.

Reference numeral 100 denotes a numerical control apparatus (hereinafter referred to as NC apparatus) which is connected in control relation with the injection servomotor 2, the pulse encoder 3, and the pressure sensor 4, for control of an injection molding machine. The NC apparatus 100 has a microprocessor (hereinafter referred to as CPU) 101 for numerical control and a CPU 102 for programmable controller (hereinater referred to as PMC), not shown. Connected through buses 115 to the PMCCPU 102 are a ROM 105 storing a sequence program for control of sequence operations in the injection molding machine and the like, and a RAM 112 for temporal storage of data. Connected to the NCCPU 101 are a ROM 104 storing a management program for generally controlling the injection molding machine, a RAM 111 for temporal data storage, and a servo interface 106 to which a servo circuit 107 for controlling the drive of the servomotor 2 is connected. A non-volatile and shared RAM 108, which comprises a bubble memory or a CMOS memory, has a memory section for storing an NC program for controlling various operations of the injection molding machine and the like, and a memory section for macro variables in which various preset are stored. Further, a bus arbiter controller (hereinafter referred to as BAC) 103 is connected to respective buses 115 of NCCPU 101, PMCCPU 102, shared RAM 108, input circuit 109, and output circuit 110, so as to control the bus to be used. A manual data input device (hereinafter referred to as CRT/MDI) 114 with a CRT display device is connected to the BAC 103 through an operator panel controller 113.

Although an illustration will be omitted, the servo circuit for respective axis is comprised of a hardware including an error register, which operates to subtract pulses supplied from the pulse encoder 3 from distribution pulses received through the servo interface 106 to output an amount of current error relative to a command position, and other elements mentioned hereinbelow. In a speed control unit of the servo circuit, a speed command, obtained through a D/A conversion of the output of the error register effected by a position control unit comprised of a D/A converter, is compared with the output, indicative of the current rotational speed of the servomotor and obtained through an F/V conversion of the output of the pulse encoder 3, or with the output of a tachometer generator (not shown) provided separately. Then, a commanded electric current (torque command), supplied from the speed controller, to be flowed through the servometer 2 is compared, in an electric current controller, with the electric current presently flowing therethrough. As a result, the servomotor driving electric current is outputted from an electric power amplifier, which cooperates with the speed controller and the electric current controller to form the speed control unit, independence on the result of the just-mentioned comparison, to control the output torque of the servomotor.

In the above-mentioned arrangement, while the PMCCPU 102 carries out the sequence control in accordance with the sequence program stored in the ROM 105, the NCCPU 101 performs the pulse distribution through the servo interface 106 to the respective servo circuit 107 associated with the respective axis in accordance with the NC program stored in the shared RAM 108, so that control associated with the respective axis of the injection molding machine is effected through the medium of the respective servo circuit 107 which operates in the above-mentioned manner. During the injection, hold, and metering processes, the command electric current supplied from the speed controller is restricted to the command torque limit value by a torque limit means (not shown), arranged between the speed controller and the electric current controller for receiving a commanded torque limit value from the output circuit 110, so that the injection pressure, hold pressure, and back pressure are controlled, respectively. Further, during the injection and hold processes, the pressure detected by the pressure sensor 4 is compared with the torque limit value supplied from the output circuit 110, and the output torque of the servomotor is controlled in a feedback manner in accordance with the difference therebetween.

As mentioned above, the conventional electrically-operated injection molding machine requires servo circuits, comprised of hardware components such a position control unit, a speed control unit, and torque limit means, for respective axes of the molding machine. In addition, in the case of changing the servo control system, it is required to change the circuit constants (resistances, for instance) of the servo circuits or effect replacement of the whole arrangement of the servo circuits. Moreover, the resolution (the magnitude of the minimum unit) of the torque limit value suplied through the output circuit 110 is determined in dependence on the resolution (the number of bits of the output signal) of the output circuit 110, and hence, the unit in pressure control is inevitably restricted in magnitude.

Figure 1:
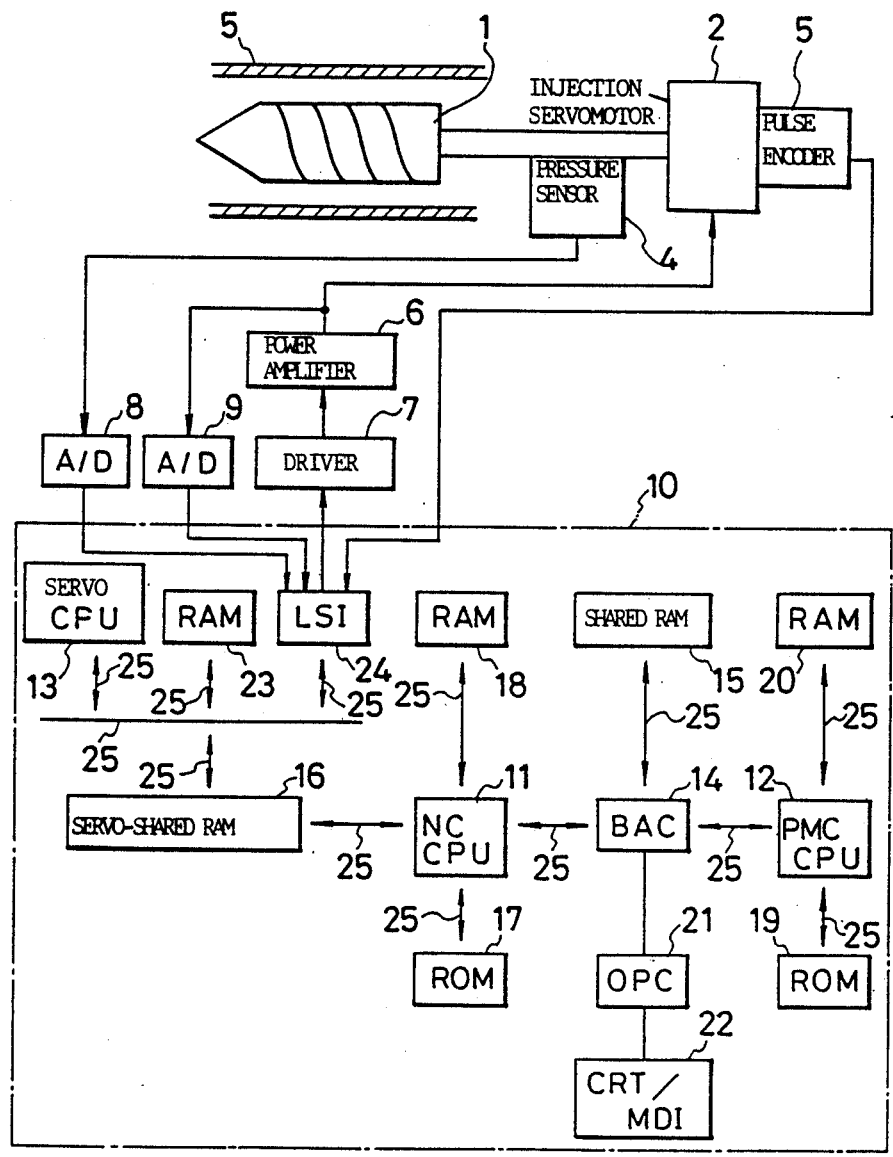
FIG. 1 is a block diagram of an essential part of an injection molding machine eqipped with a software servo control apparatus according to an embodiment of the present invention.

In the following, with reference to FIG. 1, an electrically-operated injection molding machine equipped with a software servo control apparatus according to an embodiment of the present invention will be explained. In the meantime, an illustration of elements associated with axes other than the injection axis will be omitted.

This injection molding machine is constructed basically in the same manner as that shown in FIG. 2. Elements common to those in FIG. 2 will be designated by the same reference numerals, and explanations thereof will be omitted. The elements 11, 17 and 18; 12, 19 and 20; and 14, 15, 21 and 22 of the NC apparatus 10 correspond to the elements 101, 104 and 111; 102, 105 and 112; and 103, 108, 113 and 114 of the NC apparatus 100 of FIG. 2, respectively, and explanations thereof will be omitted.

The NC apparatus 10 comprises a servo control CPU 13, which is a primary element of the software servo control apparatus, for controlling the output torque, speed and position of the servomotors for the respective axes of the injection molding machine. Connected through buses 25 to the CPU 13 are a RAM 23 for temporal data storage, an input/output circuit 24, and a servo control and the like, the NCCPU 11 being bus-connected to the servo-shared RAM 16.

Connected through a driver (including a D/A converter) to the input/output circuit 24 is an electric power amplifier 6 the output of which is utilized to drive the injection servomotor 2. Further, the output from the amplifier 6, i.e., the driving current value date obtained by converting the driving current flowing through the injection servomotor 2 by the use of the A/D converter 9, the pressure data obtained by converting the output of the pressure sensor 4 into a digital signal by the A/D converter 8, and the output of the pulse encoder 3 are supplied to the input/output circuit 24, respectively. In the meantime, elements (not shown) corresponding to the elements 6, 7 and 9 are provided for respective axes (mold clamping axis, screw rotation axis, ejector axis, for instance) which are driven by servomotors of the injection molding machine, and each of which is connected to the input/output circuit 24 together with an associated pulse encoder (not shown).

In the arrangement mentioned above, when the operation of the injection molding machine is started, the PMCCPU 12 of the NC apparatus 10 performs the sequence control in accordance with the sequence program stored in the ROM 19, and the NCCPU 11 thereof performs the control of the respective operations of the injection molding machine in accordance with the NC program stored in the shared RAM 15, in a conventional manner, so that the moving command is delivered to the servomotor associated with each axis, the same command being stored in the servo-shared RAM 16. The serve CPU 13 performs position control, speed control and torque control of the servomotors for the respective axes in response to the moving commands for the respective axes and in accordance with the servo control program. For instance, when the moving command for the injection axis is supplied to the servo-shared RAM 16, the same CPU 13 subtracts, at intervals of cycle, a value of a counter (not shown) accommodated in the input/output circuit 24 for counting feedback pulses of the pulses encoder 3 from the moving command value, to obtain a present positional deviation amount. Then, the CPU 13 determines the command electric current for the servomotor 2 on the basis of the difference between this positional deviation amount and the present speed of the injection servomotor 2 which is obtained on the basis of an amount of change in the value stored in the counter, which counts the feedback pulses. Further, the CPU 13 determines the difference between the commanded current and the present driving current value of the servomotor which is supplied through the A/D converter 9 and the input/output circuit 24, and then supplies the power amplifier 6 with the thus obtained difference through the input/output circuit 24 and the driver 7, so as to drive the injection servomotor 2. At that time, if the torque control effected by restricting the output torque of the injection servomotor is required, the commanded driving current to be outputted to the driver 7 is held to a value less than the present value specified in the program. Further, when pressure feedback control is effected in dependence on the resin pressure detected by the pressure sensor 4, the difference between the resin pressure signal, which is obtained by converting the output of the pressure sensor 4 into an associated digital signal by the use of the A/D converter 8, and the pressure value specified in the program is supplied to the driver 7.

Although the explanation regarding the injection axis alone has been explained in the above, the similar process is effected for other axes.

Since servo control is achieved by the use of a microprocessor and an associated control program, the present invention has the following advantages.

(i) A change in servo control can be easily carried out.

(ii) No additional circuitry is required even when various values of control parameters of the injection molding machine at present time are monitored, and the monitoring can be easily realized.

(iii) An optimal control can be achieved for load (resin pressure, back pressure, mold clamping pressure, for instance) which varies from time to time.

(iv) Learning control effected in dependence on conditions of the preceding injection molding cycle can be achieved.

(v) As distinct from the prior art, overflow of an error register which results in stopping the operation of the injection molding machine, can be prevented even when an excessive positional deviation is produced.

What is claimed is:

1. In an electrically-operated injection molding machine having a numerical control means for executing a first control program for numerical control so as to deliver a moving command, and arranged to control drive of a servomotor, as a drive source, under the control of the numerical control means, a software servo control apparatus comprising:
    means for executing a second control program for carrying out a predetemined servo control with a predetermined servo control constant and for producing a control output, said second control program executing means being provided separately from the numerical control means, said second control program executing means including a servo control microprocessor, and a memory for storing the moving command delivered from the numerical control means and for changeably storing said second control program; and
    means for driving the servomotor in accordance with the control output from said second control program executing means;
    whereby said predetermined servo control constant can be changed by changing said second control program.

2. A software servo control apparatus according to claim 1, further comprising:
    input/output circuit means arranged between said second control program executing means and said servomotor driving means; and
    means for detecting a rotational position of the servomotor and for generating an output;
    wherein said servomotor driving means produces an output, and wherein said second control program executing means is arranged to receive the output of said servomotor driving means and the output of said detecting means through said input/output circuit means, so as to control said servomotor driving means in accordance with these outputs.

3. A software servo control apparatus according to claim 1, wherein said servomotor driving means includes an electric power amplifier for generating an output, and wherein said servo control microprocessor operates, in accordance with said second control program, to determine a commanded current on the basis of a positional deviation amount, which is determined on the basis of the moving command and the output of said detecting means, and an amount of a change in the output of said detecting means, and the difference between the commanded current and the output of said electric power amplifier is determined and supplied to said electric power amplifier.

4. A software servo control apparatus according to claim 3, wherein said servo control microprocessor operates to restrict the output of said electric power amplifier to a value less than a commanded torque.

5. A software servo control apparatus according to claim 4, wherein said injection molding machine includes a pressure sensor, coupled to said input/output circuit means, for detecting resin pressure and producing an output, wherein said servo control microprocessor operates to restrict the output of said electric power amplifier to a value less than a commanded torque on the basis of the commanded torque and the output of said pressure sensor which is supplied to said servo control microprocessor through said input/output circuit means.

* * * * *